(12) United States Patent
Milgramm

(10) Patent No.: US 10,104,074 B2
(45) Date of Patent: Oct. 16, 2018

(54) INDEPENDENT BIOMETRIC IDENTIFICATION SYSTEM

(71) Applicant: Michael Milgramm, Valley Streem, NY (US)

(72) Inventor: Michael Milgramm, Valley Streem, NY (US)

(73) Assignee: Info Data Inc., New York, NY (US)

( * ) Notice: Subject to any disclaimer, the term of this patent is extended or adjusted under 35 U.S.C. 154(b) by 0 days.

(21) Appl. No.: 15/678,676

(22) Filed: Aug. 16, 2017

(65) Prior Publication Data
US 2017/0366542 A1 Dec. 21, 2017

Related U.S. Application Data

(63) Continuation of application No. 14/593,671, filed on Jan. 9, 2015, now abandoned, which is a continuation of application No. 13/251,887, filed on Oct. 3, 2011, now abandoned, which is a continuation of application No. 11/844,843, filed on Aug. 24, 2007, now Pat. No. 8,145,915, which is a continuation of application No. 11/430,130, filed on May 8, 2006, (Continued)

(51) Int. Cl.
| | |
|---|---|
| H04L 29/06 | (2006.01) |
| G06F 21/32 | (2013.01) |
| G06F 21/33 | (2013.01) |
| G06F 21/60 | (2013.01) |
| G07C 9/00 | (2006.01) |

(52) U.S. Cl.
CPC .......... *H04L 63/0861* (2013.01); *G06F 21/32* (2013.01); *G06F 21/33* (2013.01); *G06F 21/606* (2013.01); *G07C 9/00158* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 5,613,012 | A | 3/1997 | Hoffman et al. |
| 6,092,192 | A | 7/2000 | Kanevsky et al. |

(Continued)

*Primary Examiner* — Benjamin E Lanier
(74) *Attorney, Agent, or Firm* — Gary J. Gershik; Cooper & Dunham LLP

(57) ABSTRACT

The inventive data processing system and method enable verifiable secure transfer of information between two or more parties, each having access to at least one identity verification system, utilizing a platform-independent architecture to enable verification of identities of parties sending and receiving secured information, and ensuring that only an authorized receiving party gains access to the secured information, regardless of the type, model, ownership and/or quantity of biometric identity verification (BIV) systems being utilized by each party. Parties desiring to securely transfer information between one another register at a central security management system, and each provide at least one biometric enrollment to their unique record configured for storing multiple BIV system enrollments for each party. The inventive system and method also provide an adaptive enrollment feature which enables the system to function automatically and transparently with new BIV systems that have not been previously enrolled by the user.

6 Claims, 9 Drawing Sheets

Related U.S. Application Data now abandoned, which is a continuation-in-part of application No. 11/332,017, filed on Jan. 12, 2006, now abandoned, which is a continuation-in-part of application No. 10/128,860, filed on Apr. 23, 2002, now Pat. No. 6,993,659.

(60) Provisional application No. 60/792,365, filed on Apr. 14, 2006.

(56) References Cited

U.S. PATENT DOCUMENTS

| | | | |
|---|---|---|---|
| 6,615,191 B1 | 9/2003 | Seeley | |
| 6,618,806 B1 * | 9/2003 | Brown | G06F 21/32 |
| | | | 709/225 |
| 6,983,061 B2 | 1/2006 | Ikegami et al. | |
| 7,117,370 B2 | 10/2006 | Khan et al. | |
| 2001/0027527 A1 * | 10/2001 | Khidekel | G06F 21/32 |
| | | | 726/9 |
| 2002/0049912 A1 * | 4/2002 | Honjo | G06F 21/335 |
| | | | 726/10 |
| 2002/0053035 A1 * | 5/2002 | Schutzer | G06F 21/32 |
| | | | 726/5 |
| 2002/0099663 A1 * | 7/2002 | Yoshino | G06F 21/10 |
| | | | 705/65 |
| 2003/0105966 A1 | 6/2003 | Pu et al. | |
| 2003/0149881 A1 | 8/2003 | Patel et al. | |
| 2006/0036442 A1 | 2/2006 | Novack et al. | |

* cited by examiner

INDEPENDENT BIOMETRIC IDENTIFICATION SYSTEM

CROSS REFERENCE TO RELATED APPLICATIONS

This application is a continuation of U.S. Ser. No. 14/593,671, filed Jan. 9, 2015, which is a continuation of U.S. Ser. No. 13/521,887, filed Oct. 3, 2011, which is a continuation of U.S. Ser. No. 11/844,843, filed Aug. 24, 2007, now U.S. Pat. No. 8,145,915, issued Mar. 27, 2012, which is a continuation of U.S. Ser. No. 11/430,130, filed May 8, 2006 claiming priority of U.S. Provisional Application No. 60/792,365, filed Apr. 14, 2006, which is a continuation-in-part of U.S. Ser. No. 11/332,017, filed Jan. 12, 2006, which is a continuation-in-part of U.S. Ser. No. 10/128,860, filed Apr. 23, 2002, now U.S. Pat. No. 6,993,659, issued Jan. 31, 2006, the entire contents of each of the referenced applications are hereby incorporated by reference.

FIELD OF THE INVENTION

The present invention relates generally to a system and method for biometrically verifying and securing the transfer of information between two or more parties, and more particularly to a system and method for providing various advantageous, biometrically-enhanced platform-independent features to the process of information transfer between two or more parties.

BACKGROUND OF THE INVENTION

In the last decade, the rapidly decreasing cost of computers, coupled with simultaneous performance gains, as well as the growing availability of inexpensive access to high speed telecommunications, have resulted in a dramatic jump in the installed base of computers and broadband telecommunication connections both in consumer and commercial areas.

The proliferation of computers and low-cost high-speed telecommunications, also led to an ever-growing increase in the amount of information exchanged between various parties, within and between circles of individuals ranging from social groups (friends, family), to government, educational and corporate organizations.

In addition, the explosive growth of versatile personal communication devices (such as, for example, cellular telephones equipped with a myriad of functions) has arguably eclipsed the above-noted rise in availability of computers with high speed telecommunication connections. With each month, new personal communication options become available to consumer and organizational users, most often embodied in mobile telephones that are smaller, more powerful, and with a more impressive list of features, than comparable models released mere weeks ago.

Not surprisingly, these trends have led to an unprecedented escalation in demand for solutions related to secure transmission of information between various parties (e.g., electronic data transmissions, voice communications, etc.), and also for solutions related to controlling access to secured stored content (e.g., ranging from personal information, such as photographs, to content generated and owned by corporate, government and educational organizations).

For decades, and continuing to present day, the primary solution to securing transmission of information between parties using electronic devices, has been to enable the sending party to encrypt transmitted information, and, at the same time, provide the receiving party with the ability to decrypt and access the sent information. One popular approach to securing electronic data, transmission involves the use of PGP (or "pretty good privacy") encryption, with appropriate PGP keys being exchanged between the parties prior to data transmission, and later used to achieve encryption, and subsequent decryption, of transmitted data. Similar security measures have also been the typical approach taken to secure access to stored content, where the access to content (encrypted or otherwise) is controlled by a password, or other form of access code, provided to the party authorized to gain access thereto.

However, the above solutions have significant drawbacks. First, and most important, is the fact that none of the previously known encryption techniques enabled the parties involved in information transfer therebetween, to authenticate the identity of the party sending the information, as the source of the transmission, and also to authenticate the identity of the recipient, to confirm that the transmitted information was accessed by the specific identified party to which it was addressed, rather then by anyone having access to the receiving party's communication device and/or access code (e.g., username/password).

The same challenge is present in the field of content access control, where anyone can use a stolen, or otherwise misappropriated, access code (e.g., username/password) to gain unauthorized access to secured content. Additionally, the process of exchange, and/or provision, of PGP key information, is complex and cumbersome—a deterrent to the use of conventional encryption/decryption technologies for most parties outside government and corporate sectors.

One attempt to address the above challenges was the proposed utilization of biometric access control systems by the sending and receiving party to authenticate the identity of the sending and receiving party. The use of biometric technologies has previously gained some acceptance in the field of content access control. Therefore, the application of such technologies to the goal of securing data transmission was a reasonable approach.

Biometrics is a field of technology aimed at utilizing one or more unique personal characteristics of an individual, ranging, for example, from their fingerprints to their hand vein pattern, odor, iris image, or their DNA, to authenticate their identity. Biometric technologies are typically of two types—passive and active. Passive biometrics either do not require the individual who's identity is being verified to do anything other than to enable a certain biometric characteristic to be acquired by the system (e.g., by placing a finger on a fingerprint scanner, by looking into a retinal scanner, or by looking in the direction of a facial scanner). Active biometrics require the individual who's identity is being verified to perform one or more predetermined actions in order to enable the system to acquire the representation of one or more appropriate biometric characteristics (e.g., by providing a signature, by speaking, by squeezing a certain object, etc.). Certain types of biometric systems may incorporate a combination of active and passive biometric approaches. The various types of biometric systems are discussed in greater detail in the commonly assigned co-pending U.S. patent application Ser. No. 11/332,017 entitled "MULTIPLATFORM INDEPENDENT BIOMETRIC IDENTIFICATION SYSTEM", which is hereby incorporated by reference herein in its entirety.

While certainly appearing to address one of the key challenges of securing information transfer, biometric access control systems suffer from a number of serious disadvantages that have prevented their widespread use, and that have effectively stunted their growth in most areas outside of physical access control and local computer access control applications. To understand these disadvantages, it is useful to provide an overview of previously known biometric access control system operations.

A biometric access control system (also interchangeably referred to herein as "biometric identity verification system"), typically includes two main components—a physical device of some sort to actively, and/or passively, acquire predetermined biometric information, and program instructions (such as a software application, embedded in the device, installed on the computer connected to the device, or a combination of both), for managing the operation of the device, and for providing biometric recognition technology that enables utilization of the device to authenticate the identity of one or more individuals previously "enrolled" in the system when the individual presents the appropriate biometric information to the device.

Each individual authorized to use a biometric access control system, is first "enrolled" (i.e., registered) in the system, so that the system can acquire particular biometric information from the individual in accordance with a predetermined enrollment protocol (for example, requiring the individual to provide the same, or similar, biometric information several times, etc.). The acquired biometric enrollment information is then transformed, in accordance with one or more proprietary technologies, into a "recognition template" (or equivalent logical data structure), representative of the acquired biometric information, and then optionally optimized for use with the appropriate biometric recognition algorithms.

During a later authentication attempt, biometric information, of the same specific type as was originally enrolled (e.g., left index finger fingerprint, right iris, etc.), is presented to the biometric device, then acquired and transformed into a template, and finally compared to the enrolled stored recognition template, to determine a match, in accordance with one or more recognition criteria (for example a "recognition threshold", representative of the allowable degree of difference between the enrolled template, and the presented template, for successful authentication thereof), and therefore to authenticate the identity of the presenting individual. The two main reasons for using stored recognition templates are: (1) as a requirement for using biometric recognition algorithms during the authentication process; and (2) to ensure that actual acquired biometric information is never stored for security purposes.

The key disadvantage, crippling the use of biometrics as a broad scalable secure information transfer and access control solution, has been the combination of (1) availability of several hundred different biometric devices of various types flooding the market (with the amount of devices growing each year) and (2) the fact that in a vast majority of cases, the available biometric devices, even of the same type (e.g., fingerprint scanners) are incompatible with one another. Each of these devices uses their own biometric software (although several device manufacturers share a similar core biometric information acquisition device and biometric recognition algorithms), and during enrollment creates a biometric recognition template specific to the device. In addition, the enrollment recognition template may be stored in the biometric device, in the computer to which the device is connected, in a different computer connected thereto, or in one or more of the above, depending on the device model. As a result, the enrolled individual must always utilize the specific type and model of biometric device and the specific computer (or computer network) where they originally enrolled.

Another devastating shortcoming of previously known biometric systems, flowing from general incompatibility of biometric devices, from different manufacturers, is the fact that without any clear unifying standard, the only way for parties to truly use a biometric technology solution for verifying the identity of the sending and/or receiving party, and for securing information transfer therebetween (as opposed to using biometrics as a password replacement supplement to conventional security measures), is for all parties to acquire and use the same compatible model and type of biometric device. This is a serious drawback, because commitment to utilization of a specific type and brand of biometric identity verification device, requires a significant degree of collusion and common agreement between many individuals that intend to use the system.

In addition, the issue of compatibility and uniformity is particularly problematic for any large scale implementation of a system for verifying and securing information transfer. The requirement that all parties in a large organization involved in developing and, more importantly, using the system, to cooperate and coordinate biometric device acquisition and uniform installation, to ensure that everyone involved is using the same biometric devices equipped with compatible biometric recognition software, is very burdensome and a significant barrier to implementation of such systems.

And, if a particular biometric device in such a system is later replaced with another biometric device using a biometric recognition template incompatible with the original biometric device, all of the devices in the system must be replaced to maintain compatibility therebetween, and all individuals using those devices must be re-enrolled with the new devices.

Similar issues exist with respect to use of biometrics to control access to content—all involved parties must use a biometric device that is compatible with the system providing biometric access control to the content, and similarly are limited to using the same type and model of biometric device, and only at the computers (or computer networks) where they previously enrolled.

In addition, if a previously known installed biometric security system is changed to a new one that uses a different infrastructure, or is significantly upgraded, while the previously used biometric devices used are kept, then all of the users would need to repeat the time consuming and resource intensive re-enrollment process on each biometric device to generate a new biometric enrollment database compatible with the new biometric security system.

Moreover, there is a growing number of security applications and government rules and regulations which require the use of multiple authentication factors (i.e., by simultaneous or sequential utilization of multiple biometric identity verification systems by a user to authenticate the identity thereof) to perform certain secure tasks.

While the above-incorporated U.S. patent application Ser. No. 11/332,017 provided a solution to interoperable utilization of different types of biometric devices in the same group of users (for example, the users of a local or wide area network), it did not specifically address all of the issues involved in applying the disclosed techniques to the purpose of using biometrics to secure and authenticate transmission and receipt of information transferred between various parties.

Thus, none of the previously known biometric security approaches enable parties to verify and secure the transfer of information therebetween, utilizing any biometric identity verification system available to each party, without regard to the biometric identity verification system (or systems) utilized by the other party or parties, nor do any previously known biometric security systems enable users to each utilize one or more different biometric identity verification devices, individually or in conjunction with one another. Furthermore, none of the previously known biometric security systems provide the capability to easily add newly developed or released biometric identity verification devices thereto.

It would thus be desirable to provide a system and method for transferring secured information, between parties, while enabling authentication of identities of at least one of, the party sending the information, and the party, or parties, receiving and/or accessing the received information, with each party being able to utilize multiple different biometric identity verification systems of their choice, independently of the biometric identity verification systems used by the other party. It would additionally be desirable to provide the above-described system and method also having adaptive intelligent biometric identity verification system enrollment with the capability to easily add newly developed or released biometric identity verification devices thereto, transparently to the users thereof. It would further be desirable to provide a system and method for restricting access to content to one or more specific identified individuals, where each identified individual is able to utilize one or more biometric identity verification systems of their choice, independently of the access control system being used, and independently of the biometric identity verification systems being utilized by other identified individuals (if any). It would additionally be desirable, to provide a system and method for tracking and biometrically verifying various data relating to previously conducted information transfer between parties, whether such transfer occurred through transmission of information therebetween, or by one party allowing access to secured content to one or more other, biometrically verified, parties.

BRIEF DESCRIPTION OF THE DRAWINGS

In the drawings, wherein like reference characters denote corresponding or similar elements throughout the various figures.

SUMMARY OF THE INVENTION

Figure 1A:
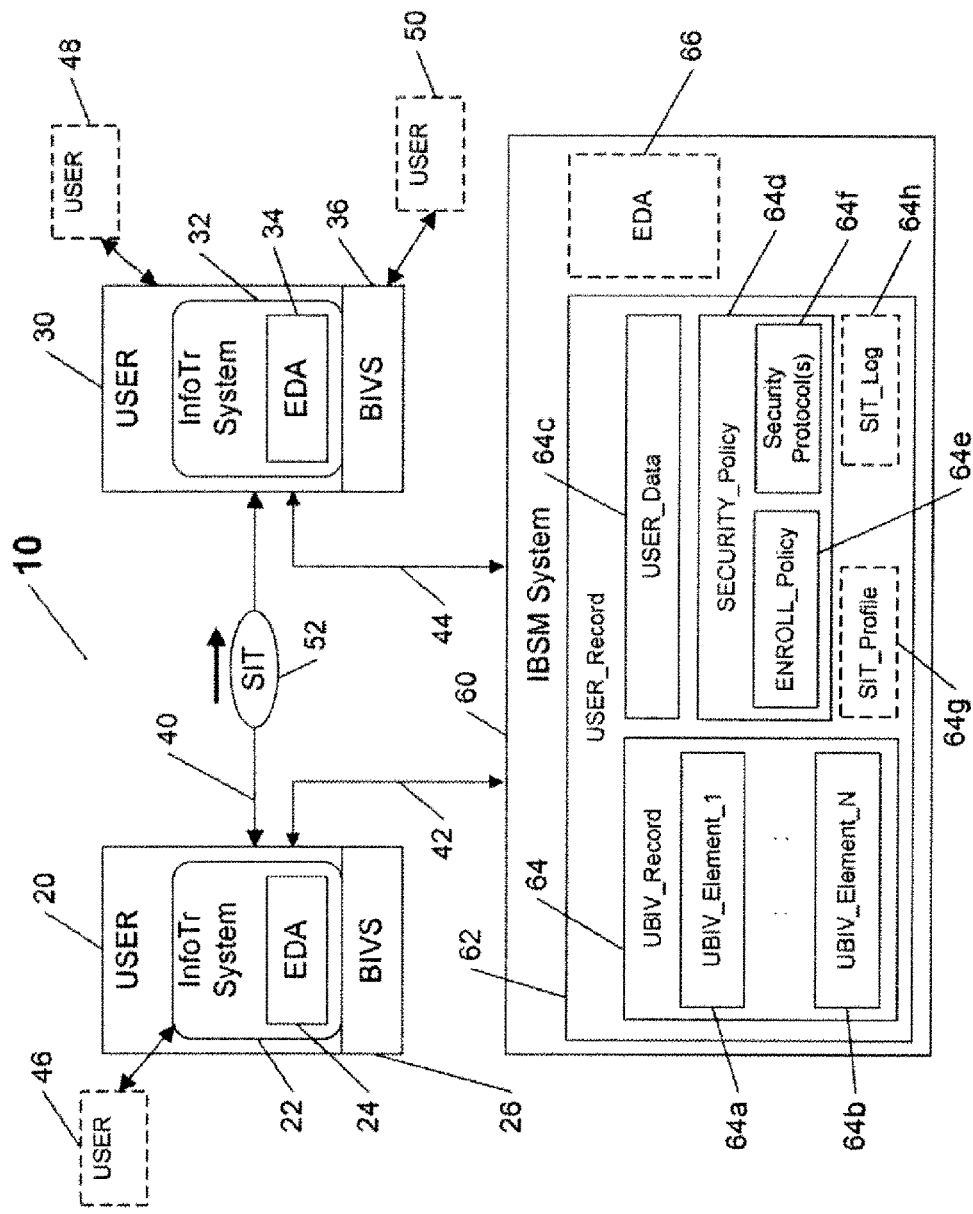
FIG. 1A shows a block diagram of a first exemplary embodiment of the inventive secure information transfer management (SITM) system, that enables verifying and securing information transfer between parties, through platform-independent identity verification.

The inventive data processing system and method enable secure transfer of information between two or more parties, each having access to at least one identity verification system, utilizing a platform-independent architecture to enable the sending and receiving parties to verify transmission and receipt of secured (e.g., encrypted) information, and/or to control access by one party to information secured by another party, regardless of the type, model, ownership, and/or quantity of biometric identity verification (BIV) systems being utilized by each party.

In one embodiment of the inventive system and method, parties desiring to securely transfer information between one another, register at a central independent biometric security management (IBSM) system, and each provide a biometric enrollment for each biometric device (i.e., BIV system) that they wish to utilize, which are then stored by the IBSM system in their unique record. Advantageously, each such record is configured for storing multiple BIV system enrollments for each party, such that the parties can each use one or more different BIV systems in conjunction with the inventive system. Optionally, if there is a pre-existing biometric security system that comprises records with biometric enrollments for one or more users, as part of the registration process the IBSM system can readily import existing biometric enrollments for each user into their individual record. In this case, the user having such previously obtained biometric enrollment(s) for specific BIV devices, would not need to repeat the enrollment procedure for those devices.

The inventive system and method also provide an adaptive enrollment feature which enables the system to function automatically and transparently with new BIV systems that have not been previously enrolled by the user, if such systems produce enrollments that are sufficiently similar to the ones already stored in the user's record.

In addition, during the initial user enrollment process, a predetermined security policy is applied to the user's record in the IBSM system. The security policy governs all key parameters of the user's utilization of the BIV systems to ensure compliance with the security rules and policies of the owner of the security infrastructure that utilizes the inventive system and method (which may range from a singe user to an organization (e.g. a corporation, a government agency, etc.)). The security policy also includes an enrollment policy that determines the requirements which must be met by the user when adding new WV systems in the future.

While the security policy is preferably predetermined before user enrollment, optionally, if permitted by the owner of the security infrastructure or another authorized party, or, if the user is the owner or authorized party, the user may modify an existing security policy or, if no security policy is present, the user may define the security policy.

Thereafter, the inventive system also enables any registered party to send biometrically (and otherwise) secured information to the other party utilizing any available BIV system (or systems) that is compatible with one or more of their registered biometric enrollments stored in their IBSM system record, regardless of BIV system ownership, and without requiring local enrollment. Thus, registered users can advantageously utilize a compatible BIV system of any information transfer device capable of communication with the IBSM system.

In another embodiment of the inventive system and method, that may be readily utilized on its own, or in conjunction with the previously described embodiment, a party registered with the IBSM system, that owns certain secured content, is able to selectively designate identities of one or more registered parties that are authorized to access the secured content and/or a portion thereof, upon verification of their identity, and, optionally, provide one or more rules of varying complexity to the IBSM system governing such access.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The system and method of the present invention remedy the disadvantages of previously known biometric solutions directed at verifying and securing information transfer between parties, by providing a platform-independent biometric security management system architecture that enables registered parties to securely transfer information therebetween, and verify the identities of the party enabling the transfer (e.g., by transmission of information, or by enabling secured access to stored information), and/or of the recipient party gaining access to the information (e.g., by receiving the information, and/or by accessing secured stored information), utilizing any biometric identity verification system available, regardless of the type, model, and/or ownership, as long as the utilized biometric system is compatible with one or more of their previously registered multiple biometric enrollments.

The inventive system and method achieve the above, and other objectives, by enabling prospective users to register with a centralized independent biometric security management (IBSM) system, and, during the registration process, in addition to providing identifying information (name, contact information, etc.), to also supply one or more biometric enrollments, utilizing one or more biometric identity verification systems (i.e., BIV system) available to them. Any registered user is also able to add additional biometric enrollments, from any other BIV system, at a later time to expand their ability to utilize the inventive system utilizing many different BIV systems.

The novel IBSM system stores the above information in unique records, each assigned to an individual registered user, and further enables additional information to be stored in the records. Advantageously, each such record is configured for storing multiple BIV system enrollments for each user, such that each user can each utilize one or more different BIV systems in conjunction with the inventive system. This feature of the present invention is particularly important for the growing number of security applications which require multiple authentication factors (i.e., by simultaneous or sequential utilization of multiple BIV systems to authenticate identity) to perform certain secure tasks.

In addition, as described in greater detail below in connection with FIG. 7, during the initial user enrollment process, a predetermined security policy is applied to the user's record in the IBSM system. The security policy governs all key parameters of the user's utilization of the WV systems to ensure compliance with the security rules and policies of the owner of the security infrastructure that utilizes the inventive system and method (which may range from a singe user to an organization (e.g. a corporation, a government agency, etc.)). The security policy also includes an enrollment policy, as discussed in greater detail below in connection with FIG. 8, that determines the requirements which must be met by the user when adding new WV systems in the future.

While the inventive system and method are described below in connection with certain drawing figures in exemplary embodiments, as being advantageously configured for use with transfer of electronic information over a communication network (e.g., the Internet or other telecommunications network), it should be understood to one skilled in the art, that the inventive system and method may be readily and advantageously utilized for enabling secured information transfer of any type (audio (e.g., voice), video, sensor information, machine-readable data, etc.), without departing from the spirit of the invention, as a matter of necessity or design choice.

Similarly, while the descriptions of various embodiments of the inventive system and method, interchangeably refer to various data processing systems used in conjunction therewith as "computers", it should be noted that any system with similar capabilities, necessary for performing the tasks required by the inventive system and method, may readily be used as a matter of necessity or design choice, without departing from the spirit of the invention. For example, it is specifically contemplated that a wireless telephone (such as a cellular telephone) with sufficient data processing capabilities may be readily utilized in accordance with the present invention.

Before describing the various embodiments of the inventive system and method, and the components, infrastructure, and operation in greater detail, it would be helpful to provide the definitions of certain terms used in the drawing figures, and in the accompanying descriptions. Table 1 below contains summary of definitions of commonly used terms within the context of the description of the various embodiments of the present invention.

Because the terminology that may be currently utilized to describe the venous embodiments of the novel system (and its functionality), evolves and changes rapidly, for the purposes of clarity, and without departing from the spirit of the invention, the various elements, components, infrastructures, and process steps of the inventive system and method, are described in Table 1, and further below, in terms of their required or desired functionality, and/or in terms of objectives they are intended to accomplish, in accordance with the present invention, rather than as specific structural and/or process implementations, which may change in nomenclature with advances in information systems technology.

For example, as computers of various types are well known in the art, it is presumed that any computer used in conjunction with the present invention, will include the typical components necessary for its operation, e.g., one or more CPUs, memory, long term data storage, and, in cases of computers typically utilized by users, one or more input devices, a display, and so on. In addition, because a number of abbreviated terms are used for the sake of convenience in FIGS. 1A to 6, and further below, Table 1 also provides the definitions of all abbreviated terms used herein,

TABLE 1

| | | (Definitions/Terminology) |
|---|---|---|
| # | TERM | DEFINITION |
| 1 | USER/USER | A user, for the purposes of the present invention, is defined as:<br>1. any party that desires to securely and/or verifiably transfer information to another party (or parties), whether by transmission thereto, or by granting (to the other party or parties) secured access to content that includes information, and/or<br>2. any party that desires to receive secured and/or verified information from another party (or parties), whether by transmission therefrom, or by accessing secured content, as permitted by the other party (or parties).<br>Thus, in accordance with the present invention, users may range from private individuals, to members of groups of any type and with any amount of hierarchical levels and subgroups and that may be readily overlap with other groups (e.g., groups of friends, family members, employees of a corporation, government employees and/or officials of varying ranks in one or more agencies, students of a particular university, etc.) |
| 2 | InfoTr System | Information transfer system. For the purposes of the present invention, an information transfer (InfoTr) system, is defined as any system having at least some of the following characteristics:<br>1. capability for transmitting information to at least one other InfoTr system;<br>2. capability for receiving information from at least one other InfoTr system;<br>3. capability for storing data and applications for issuing instructions, and, in response to issued instructions, performing tasks involving data stored therein or provided thereto, sufficient to enable functionality necessary for operation of the novel system and method as described blow in connection with FIGS. 1A to 6;<br>4. capability for displaying information relevant to its operation and the performed tasks;<br>5. capability for communicating with the IBSM system (see definition below); and<br>6. capability for receiving instructions from an operator.<br>In accordance with the present invention, the term "InfoTr system" can also refer to a collection of two or more interconnected InfoTr systems (e.g., a local area network) having the above capabilities individually, and/or jointly.<br>The InfoTr system preferably includes an operating environment, and one or more instruction sets (e.g., program applications), that provide it with the ability to execute functions relating to sending and/or receiving information. By way of example, for an InfoTr system implemented as a personal computer, the operating environment may be an appropriate operating system, while an exemplary information transfer instruction set, may be an electronic mail program.<br>By way of example, computers ranging from pocket-sized personal digital assistants (PDAs), and smart telephones to personal desktop or notebook computers, to high power servers and server networks, are the most common exemplary implementations of InfoTr systems, and, in most cases, readily possess all the capabilities necessary for operation as components of various embodiments of the inventive system and method. |

TABLE 1-continued (Definitions/Terminology)

| # | TERM | DEFINITION |
|---|------|------------|
|   |      | Accordingly, the InfoTr systems shown in various embodiments of the present invention, are preferably computers or advanced communication devices with appropriate similar functionality (e.g., wireless/cellular/satellite telephone, military communicator, radio transmitter, etc.), with the specific type, capabilities, and configuration thereof, being determined as a matter of necessity and/or design choice. However, it should be noted that any system, even if falling outside the conventional definition of a "computer" or communication device, may be utilized as a InfoTr system in accordance with the present invention, without departing from the spirit of the invention, as long as such a system posses the necessary capabilities selected from (1) to (6) above. |
| 3 | BIVS | Biometric identity verification system (See FIG. 1A and accompanying description) |
| 4 | BIVD | Biometric identity verification device (See FIG. 1B and accompanying description) |
| 5 | BIVA | Biometric identity verification application (See FIG. 1B and accompanying description) |
| 6 | EDA | Encryption/decryption application. For the purposes of the present invention, an EDA is a set of instructions, for example embodied in a program application executable by an InfoTr system, and/or by the IBSM system, or as a module to another application (e.g., the application responsible for transmission of information), capable of encrypting and/or decrypting electronic information in any form. Advantageously, any type of EDA, whether currently available, or developed in the future, may be readily in conjunction with the inventive system and method without departing from the spirit of the invention. In one embodiment of the inventive system and method, during encryption of information to be transmitted, the EDA utilizes at least a portion of the UBIV_Element (see definition below) of the user of the InfoTr system sending the transmission. |
| 7 | SECURITY_Policy | The security policy governs all key parameters of utilization of the BIV systems by authorized users to ensure compliance with the security rules and policies of the owner of the security infrastructure that utilizes the inventive system and method. The security policy may also include an enrollment policy |
| 8 | ENROLL_Policy | The enrollment policy: determines the requirements which must be met by the user when adding enrollments for new BIV/systems, to the USER_Record in the future. |
| 9 | Information/ Data/Content | As defined herein, information, data, or content, may be of any type and in any number of formats that can be, in whole or in part, transmitted, interacted with (e.g., viewed, modified, reviewed, etc.), generated, acquired, analyzed, deleted, reviewed, and/or otherwise processed by an InfoTr system. For example, information may include, but is not limited to, one or more of the following: text, images, audio, video, transactional information, instrument or sensor readings (e.g., medical, scientific, military), links to other data, executable programs and supporting files, etc. Additionally, data may be static, interactive, or a combination of both. While it may be used interchangeably with "information" or "data", the term "content" preferably represents certain desirable information that is of interest to one or more parties, access to which is controlled by one or more parties. |
| 10 | SIT | Secured information transmission (See FIG. 1A and accompanying description) |

TABLE 1-continued (Definitions/Terminology)

| # | TERM | DEFINITION |
|---|------|------------|
| 11 | IBSM System | Independent biometric security management system. (See FIG. 1A and accompanying description) |
| 12 | SITM system | Secure information transfer management system - the system of the present invention, at a minimum including two InfoTr systems, each accessed by a user, and each capable of communication with an inventive IBSM system, and optionally of communication between one another, that, in at least one inventive embodiment, can be utilized by users to securely transfer information between one another, and to verify identity of transmitting user, as well as to verify the identity of the user receiving and accessing the information. |
| 13 | Communication Link | As defined herein, a communication link is preferably any form of a communication connection between the various components of the inventive SITM system (e.g., InfoTr systems, the IBSM system, etc), that enables data transmission of the appropriate types of information there between.<br>Thus, each communication link may include, but is not limited to, one or more of the following, in any combination: direct telecommunication line(s), wireless link(s) (e.g., satellite uplink, radio, cellular, wi-fi, etc.), and communication network(s) (such as a LAN (local area network), a WAN (wide area network), or the Internet). |
| 14 | USER_Record | Record stored in IBSM System representative of the user's UBIV_Element and additional information. (See FIG. 1A and accompanying description) |
| 15 | UBIV_Element | User biometric identity verification element. (See FIG. 1A and accompanying description) |
| 16 | SIT_Profile | Secured information transfer profile. (See FIG. 1A and accompanying description) |
| 17 | SIT_Log | Secured information transfer log. (See FIG. 1A and accompanying description) |
| 18 | SCA_Profile | Secured content access profile (See FIG. 4 and accompanying description) |
| 19 | CA_Record | Content access record (See FIG. 4 and accompanying description) |
| 20 | Recipient_INFO | Information identifying the specific user (or users) as intended recipient(s) of SIT being sent by a user. (See FIG. 5 and accompanying description) |
| 21 | Sender_BIVE | Sender biometric identity verification element (See FIG. 5 and accompanying description) |
| 22 | Recipient_BIVE | Recipient biometric identity verification element (See FIG. 5 and accompanying description) |
| 23 | UBIVE_Threshold | User Biometric Identity Verification Element Threshold (see FIG. 8 and accompanying description). |

It should be noted, that the specific numbers of users, and corresponding InfoTr systems shown in the various FIGS. 1A to 4, are provided by way of example only. Because the inventive secure information transfer management (SITM) system is completely scalable, it may be used in configurations ranging from as few as two users, to as many as practically possible, as a matter of design choice or convenience, without departing from the spirit of the invention.

Referring now to FIG. 1A, a first exemplary embodiment of the inventive SITM system 10 is shown. The SITM system 10 enables secure and verifiable transfer of information between at least two users 20 and 30 (see Table 1, definition #1). Each of the users 20, 30 preferably operates a corresponding information transfer (InfoTr) system 22, 32 (for example a computer or mobile communication device), capable of transmitting information to other InfoTr systems of the same, or of different type and/or configuration. Thus, for example, each of the InfoTr systems 22 and 32 may be of a different type—InfoTr system 22 may be a personal computer, while InfoTr system 32 may be a smart mobile communication device.

Each of the InfoTr systems 22, 32 preferably includes a corresponding encryption/decryption application (EDA) 24, 34, respectively (see Table 1, definition #6), for enabling each of the users 20, 30 to secure and verify information transferred therebetween (for example by encrypting it at for transmission and then decrypting it when received and accessed, upon recipient identity verification).

Each of the InfoTr systems 22, 32 includes, or has ready access to, a corresponding biometric identity verification system (BIVS) 26, 36. As discussed in greater detail above, in connection with the background of the present invention, a BIVS utilizes one or more unique personal characteristics of a user registered therewith, to verify their identity. As discussed in greater detail below in connection with FIG. 1B, a BIVS typically includes a biometric identity verification device (BIVD) for acquiring biometric information from a user, and a corresponding biometric identity verification application (BIVA) for controlling the operation of the BIVD, and for enabling the acquired biometric characteristics to be used for identity verification.

In accordance with the present invention, each of the BIVS 26, 36 may be any type of BIVS whatsoever. Advantageously, the BIVS 26, 36 do not need to be compatible with one another. Thus, the BIVS 26 may be a fingerprint scanner, while the BIVS 36 may be a facial recognition system. It should be noted that in accordance with the present invention, the term BIVS may also refer to multiple BIVDs connected to the same InfoTr system, that can provide multiple authentication factors for certain predetermined security applications.

Preferably, each BIVS 26, 36 is capable of "enrolling" (i.e., registering) one or more users (e.g. users 20, 30), and generating a corresponding user biometric identity verification element (UBIV_Element), representative of the biometric information acquired by the BIVD and processed for use in future user identity verification (e.g., by creating a recognition template, or otherwise). In previously known biometric security systems, a user's UBIV_Element is typically stored in one or more of the BIVS, the InfoTr system connected thereto, or, in client-server configurations, on a separate central InfoTr system.

The SITM system 10 also includes an independent biometric security management (IBSM) system 60, which is the key component of the present invention. The IBSM system 60, is preferably an data processing system (such as one or more computers (e.g. a server, or network of servers)), capable of communicating and interacting with as many different InfoTr, and BIVS types, models and configurations as is practicable or, at a minimum, as many as is required by the desired SITM system 10 configuration, capacity, and intended use.

The SITM system 10 also includes a communication link 40, for enabling communication between the InfoTr system 22 and the InfoTr system 32, a communication link 42 for enabling communication between the InfoTr system 22 and the IBSM system 60, and a communication link 44 for enabling communication between the InfoTr system 32 and the IBSM system 60 (see Table 1, definition #11). One or more of the communication links 40, 42, 44 may be different from one another, or they may all be the same. For example, the communication link 40 may be a wireless voice telecommunication link, while communication link 44 is a broadband land telecommunication line and the communication link 44 is a wireless data communication link. Or, all of the communication links 40, 42, 44 may be the Internet.

Prior to utilization of the inventive SITM system 10, each user desiring to take advantage of the advantageous SITM system 10 functionality (e.g. each of the users 20, 30), performs a registration or enrollment process, for example such as the exemplary initial user enrollment process 600 described below in connection with FIG. 7. Regardless of the specific initial enrollment process used, such a process, at a minimum, involves the following steps:
  (1) providing certain predetermined personal identifying information (e.g. name, address, etc.);
  (2) verification of that information (by third party confirmation, in case of certain types of users (corporate or government employees, etc.), or by other well known reliable identity verification approaches;
  (3) storing, in the IBSM system 60, the provided information (and optionally the source of verification) as USER_Data 64c in a corresponding record (USER_Record 62) for each user. Optionally, if the user is already biometrically registered at their InfoTr system through the corresponding BIVS (e.g., if the user 20 previously used BIVS 26 to enroll on their InfoTr system 22), and the IBSM system 60 is appropriately configured by an authorized administrator, it may accept identity verification based on previous local InfoTr system biometric registration; and
  (4) utilization of their respective BIVS (e.g. BIVS 26 for user 20, and BIVS 36 for user 30) to generate one or more corresponding UBIV_Element(s) and transmit it, via respective communication links (e.g. link 42 for user 20, and link 46 for user 30), to a UBIV_Record 64, configured for storage and utilization of multiple concurrent UBIV_Elements, that is part of the corresponding USER_Record 62 stored in the IBSM system 60. Optionally, if there is a pre-existing biometric security system (not shown) that comprises records with biometric enrollments for one or more users, and that can communicate with the SITM system 10, as part of the registration process, the IBSM system 60 can readily import existing biometric enrollments for each user into the UBIV_Record in their individual USER_Record. In this case, the user having such previously obtained biometric enrollment(s) for specific BIVS(s), would not need to repeat the enrollment procedure for those systems/devices.

Thus, for each user 20, 30, the IBSM system 60 stores the individual unique USER_Record 62, that includes that user's verified identifying information USER_Data 64c, as well as at least one of their corresponding UBIV_Element(s) 64a-64b in the UBIV_Record 64. The USER_Record 62 also preferably includes a SECURITY_Policy 64d (defined in Table 1 above), which also includes an ENROLL_Policy 64e (defined in Table 1 above), as well as one or mare security protocol(s) 64f that define the specific security rules and parameters thereof.

By way of example, the SECURITY_Policy 64d may include security protocols 64(f) that define the rules for sending secured information to other registered users (such as a selectable list of potential recipients, the need for receipt and/or viewing verification, etc.), as well as define one or more additional rules of varying complexity, governing the recipient's access to the transmitted secured information. For example, a sending user 20 can specify a rule, that a particular transmission of information (e.g., electronic mail message with attachment), may only be opened by the intended recipient, user 30, if that recipient successfully passes identity verification from a BIVS 36 that includes two (or more) different biometric identity verification devices (e.g., a fingerprint scanner and a facial scanner), or that two separate recipients (user 30 and user 50) must both verify their identity with the IBSM system 60, in order to access the content of the transmission.

As discussed below in connection with FIGS. 2 and 8, any user can generate additional UBIV_Elements for their USER_Record, utilizing BIVS of different types, models, and/or configurations, such that their UBIV_Record in the USER_Record stores multiple UBIV_Elements for a variety of BIVSs. This is a crucial advantageous feature of the present invention—because any user registered with the IBSM system 60 is able to verify their identity through any BIVS, even one which they never used, or one that is part of another user's InfoTr system, if it is capable of utilizing any of the UBIV_Elements stored in the USER_Record. This advantageous feature of the present invention is described in greater detail below in connection with FIG. 8.

The above-described novel feature enables the IBSM system 60 to be truly "platform-independent" with respect to compatibility with various InfoTr and BIVS types, models, and configurations. For example, a user 50, previously registered with the IBSM system 60, and having a UBIV_Element compatible with the BIVS 36 stored in their USER_Record, is able to utilize the InfoTr System 32 and the BIVS 36 of the user 30, to verifiably exchange secured information with other registered users, for example, with another user 46, that may have access to the InfoTr system 22.

Figure 1B:
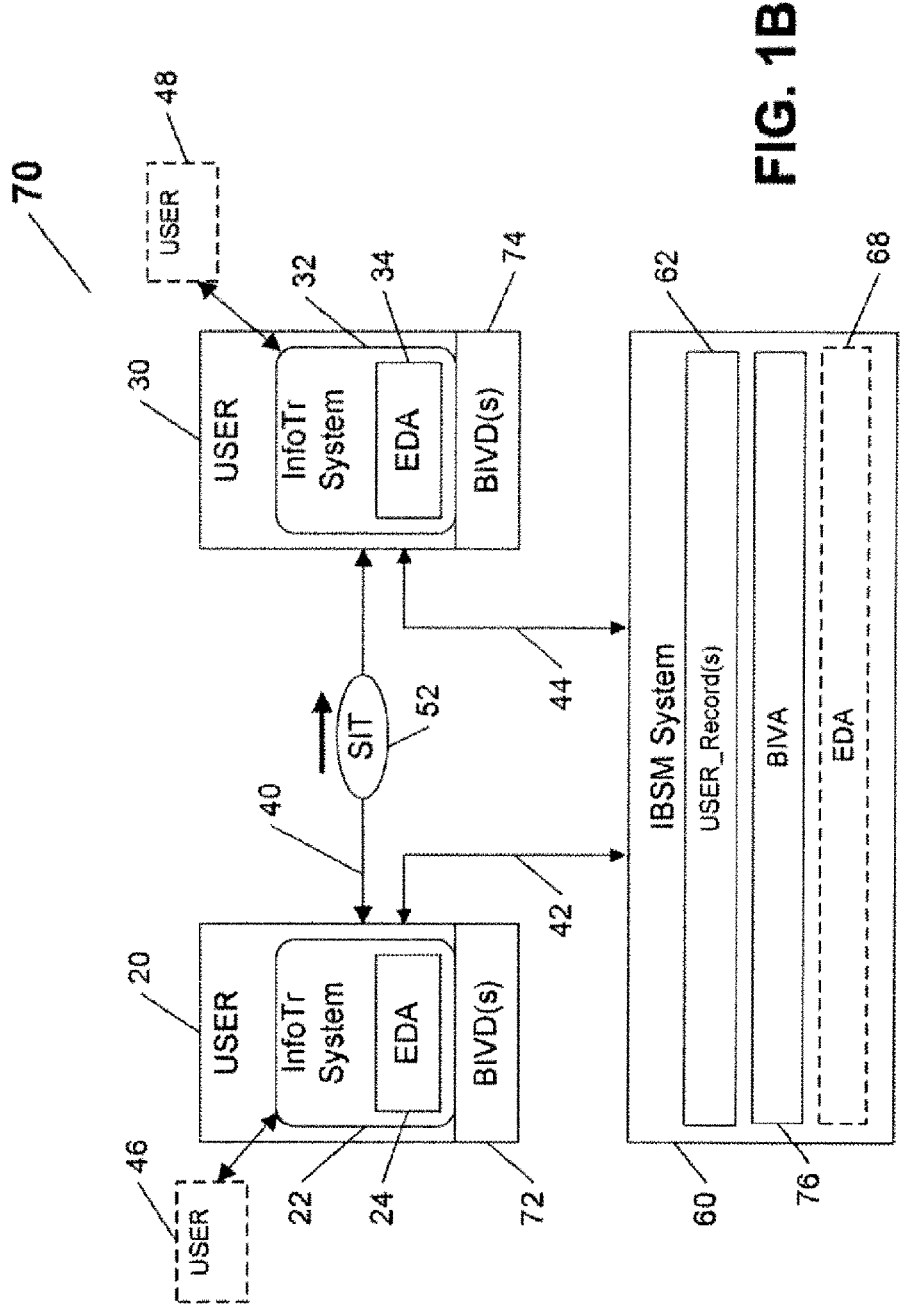
FIG. 1B shows a block diagram of an alternate exemplary embodiment of the inventive SITM system of FIG. 1A.
Figure 2:
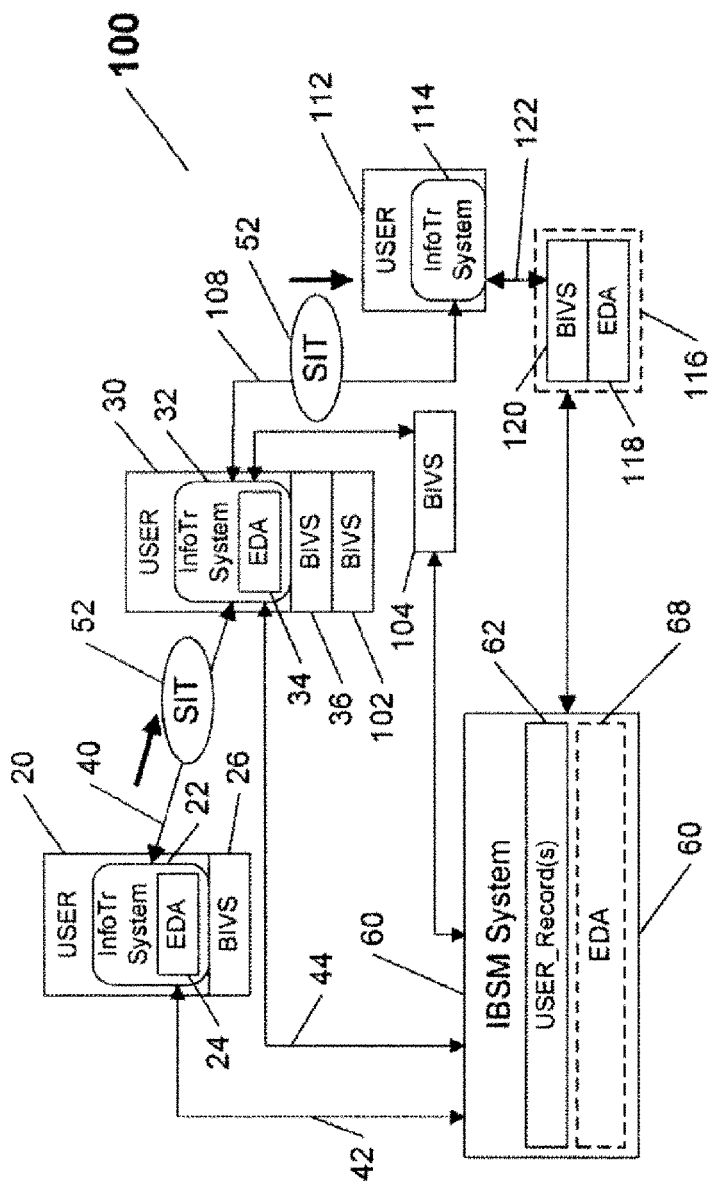
FIG. 2 shows a block diagram of a second exemplary embodiment of the inventive SITM system, that enables verifying and securing information transfer between parties, through platform-independent identity verification.
Figure 3:
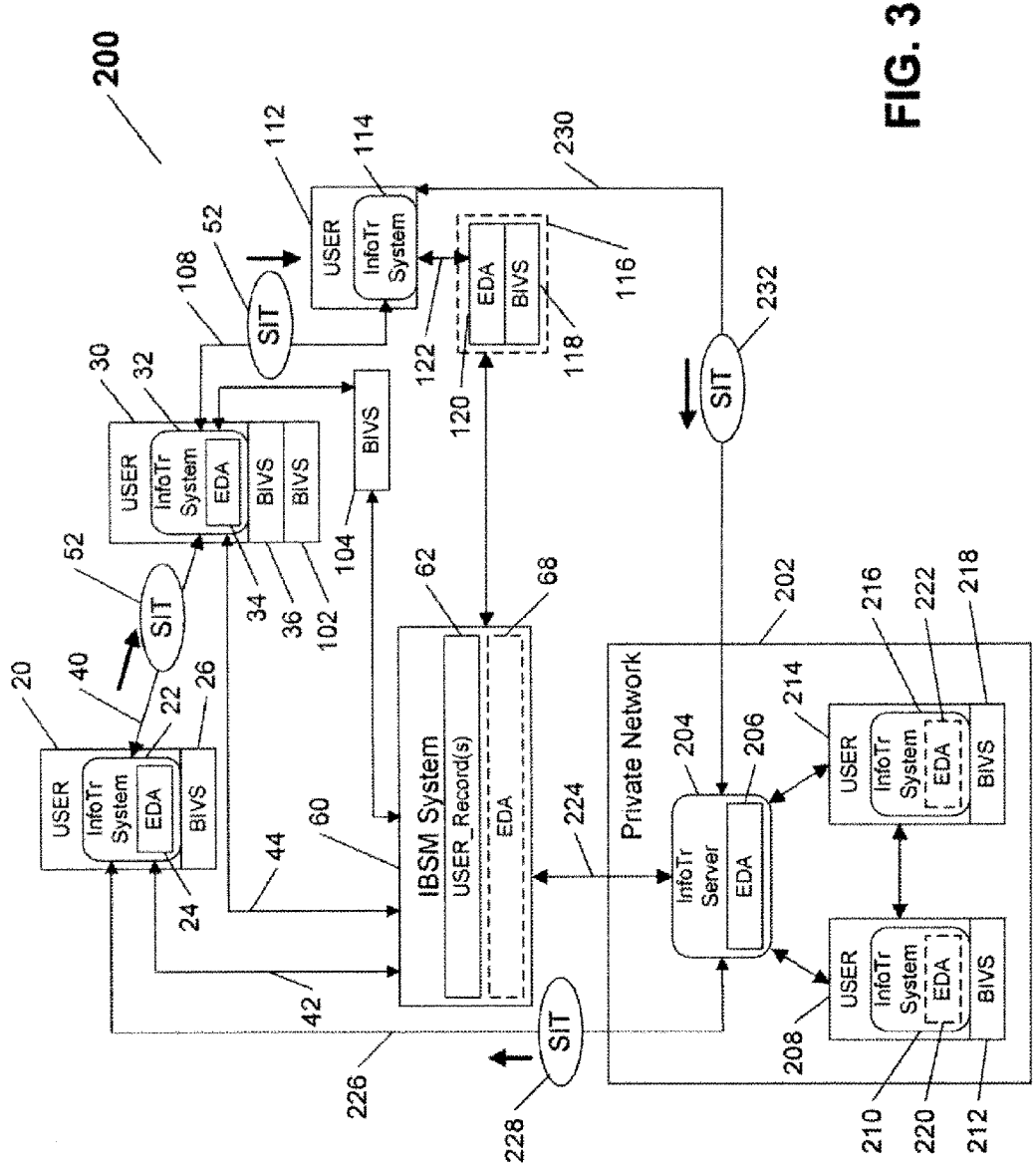
FIG. 3 shows a block diagram of a third exemplary embodiment of the inventive SITM system, that enables verifying and securing information transfer between parties, through platform-independent identity verification.
Figure 4:
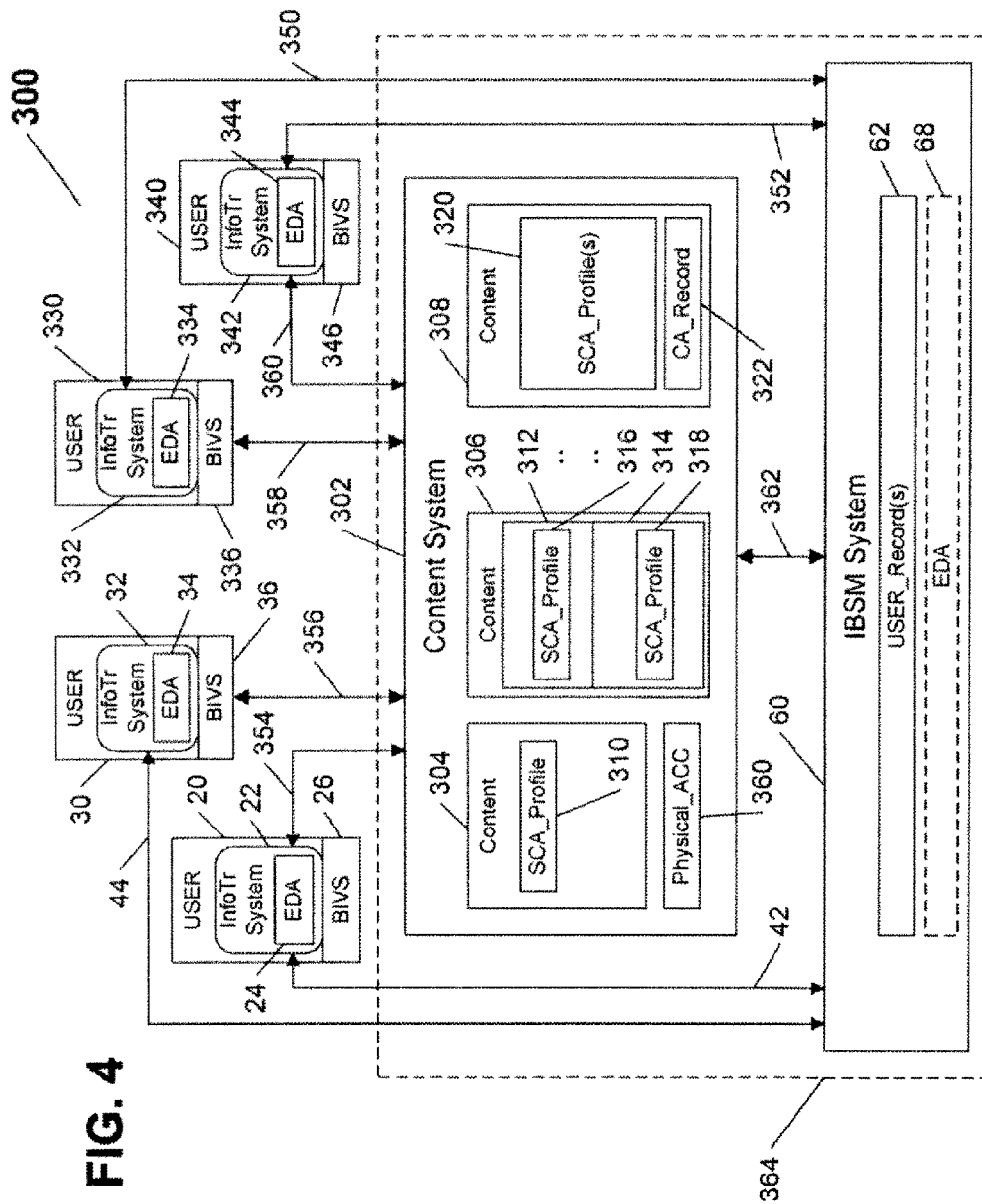
FIG. 4 shows a block diagram of an exemplary embodiment of the inventive SITM system, that enables verifying and securing information transfer between parties, through platform-independent identity verification.

Thus, preferably, the IBSM system 60 may be scaled to any necessary capacity, and provided with all necessary components (hardware and/or software), to enable it to readily communicate, and interact with, the various InfoTr systems, BIVS, and other components of the inventive SITM system (as illustrated, by way of example, for SITM systems 10 of FIG. 1A, 70 of FIG. 1B, 100, of FIG. 2, 200 of FIG. 3, and 300 of FIG. 4).

It should also be noted that, the "Independent Biometric Security Server" disclosed in the above-incorporated U.S. patent application Ser. No. 11/332,017, may be readily and advantageously configured for use as an IBSM system 60. Optionally, any other data processing system capable of similar or equivalent biometric platform-independent functionality to the "Independent Biometric Security Server" may be readily utilized as the IBSM system 60, as a matter of design choice, without departing from the spirit of the invention.

Additionally, as long as the above-described minimum IBSM system 60 registration steps are followed, any user can readily utilize another user's InfoTr system and BIVS to register, as long as independent verification of the users identity is available to finalize registration.

In accordance with the present invention, the users 20, 30 utilize the IBSM system 60 during transfer of a secured information transmission (SIT) 52, between InfoTr systems 22 and 32, over the communication link 40, to verify identities of the sending user (e.g., user 20), as well as the identity of the user receiving and accessing the SIT 52 (e.g., user 30). In addition, the IBSM system 60 may be advantageously utilized as part of the SIT 52 generation process (e.g. when the information to be transferred is encrypted or otherwise secured) by the EDA 24, and then accessed (e.g., decrypted) by the EDA 34.

In an alternate embodiment of the invention, in addition to, or instead of one or both of the EDA 24, 34, the IBSM system 60 may include an optional EDA 66, that performs all, or some, of the tasks necessary for generating and accessing the SIT 52. Additionally, rather than being transferred through the communication link 40, in yet another alternate embodiment of the invention, the SIT 52 may be readily transmitted between InfoTr systems 22 and 32 through the IBSM system 60 via the communication links 42, 44.

In summary, in one of its simplest implementations, the inventive SITM system 10 operates as follows: the user 20, desiring to transmit certain information to the user 30, indicates, to the IBSM system 60, themselves as the sender, and the user 30 as the intended recipient. The user 20 then provides biometric information to the IBSM system 60 through their BIVS 24, which is processed and compared to a compatible UBIV_Element stored in their USER_Record, to verify the identity of the user 20. The information to be transferred is then encrypted to generate the SIT 52 (optionally utilizing at least a portion of one or both of the UBIV_Element of the sending user 20, and the UBIV_Element of the receiving user 30). The SIT 52 is then transmitted to the user 30, and upon receipt by the InfoTr system 32, to access the information in the SIT 52, the user 30 must verify their identity to the IBSM system 60, by providing biometric information thereto through the BIVS 36, that, when processed, is successfully matched to a compatible UBIV_Element stored in the USER_Record of the user 30 (optionally in accordance with predetermined biometric recognition criteria (e.g., threshold, etc.), that may have been present in the IBSM system 60, or that may have been specified by the sending user 20 to the IBSM system 60, for the SIT 52, or for all of user 20 data transfers).

Figure 5:
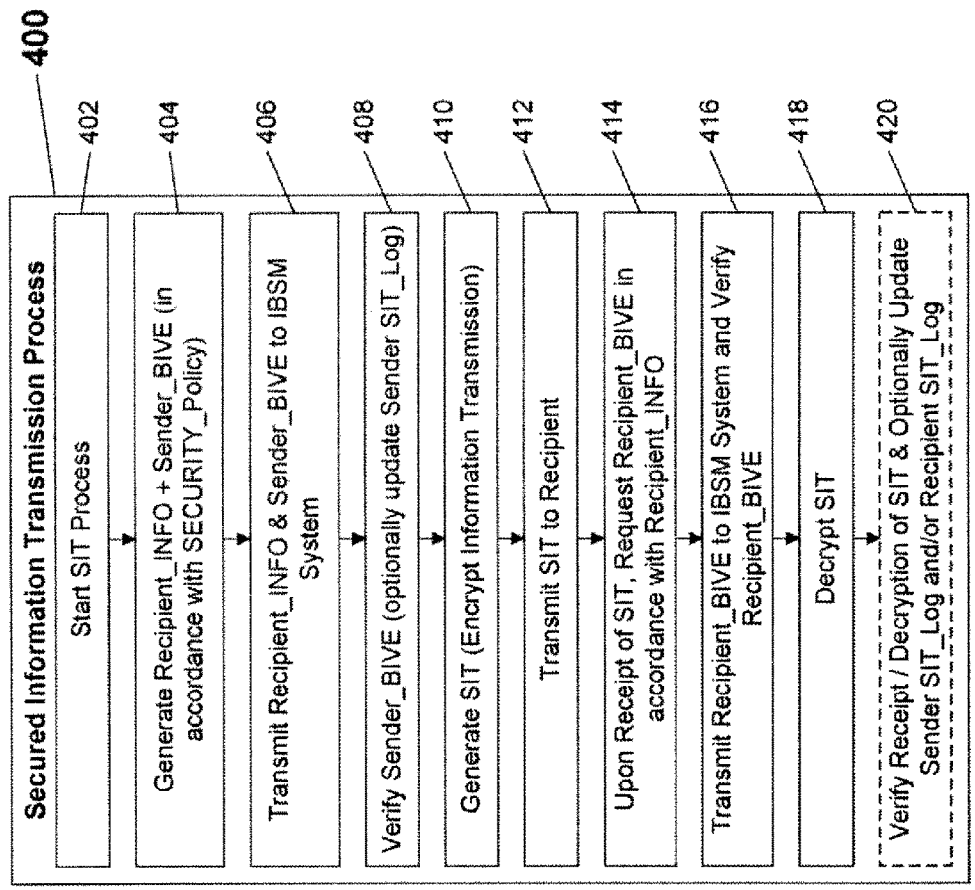
FIG. 5 shows a logic flow diagram of an exemplary embodiment of a process of implementing and utilizing the SITM system of FIGS. 1A-3.

When the identity of the user 30 is verified as the intended recipient, the IBSM system 60 enables the EDA 34 to decrypt the SIT 52 thus allowing the user 30 to access the transferred information, while optionally recording the access event, and optionally notifying user 20 of the verification of the access by the designated recipient (user 30). An exemplary detailed embodiment of a process for the operation of the SITM system 10 for secured and verified information transmission is shown in FIG. 5, and described in detail below in connection therewith.

In accordance with the present invention, the organization that owns or is subscribed to the SITM system 10, or, optionally, the sending user, may be given the ability to have significant control over the manner in which their transferred secured information is accessed by the recipient through modification of the SECURITY_Policy 64*d*, for example, defining, in the security protocol(s) 64*f*, one or more criteria (e.g., in form of rules), that must be met for the recipient user to gain access to the information. For example, the SECURITY_ Policy 64*d* can specify that in order to access information in SIT 52, both the user 30, and another user 48, must verify their identities to the IBSM system 60, (e.g., both through the BIVS 36, or with each user utilizing their own BIVS). Alternately, the SECURITY_Policy 64*d* can specify that the user 30 must utilize two separate BIVS of different types, or to utilize their BIVS 36 in conjunction with another from of security, such as a password or a PIN code. Optionally, the SECURITY_Policy 64*d* can set the user 20 SIT 52 to expire, or otherwise be erased, if the user 30 does not access it during a specified period of time.

Additionally, the SECURITY_Policy 64*d* can specify the amount and detail level of information, about the events relating to the secured data to be tracked and/or recorded by the IBSM system 60. For example, the SECURITY_Policy 64*d* can require notification of delivery of SIT 52, notification of user 30 acknowledging receipt of SIT 52, and notification when user 30 accesses the information therein (as well as notification of any failed attempts to access the information).

Alternately, rather than defining all such parameters as part of a SECURITY_Policy 64*d*, these parameters may be defined by the user as "user preferences". Optionally, each user's preferences relating to transfer of secured information, and for tracking events related thereto, as well as event tracking information can be stored in their USER_Record, for example as secured information transmission profile (SIT_Profile) (shown as optional SIT_Profile 64*g* in FIG. 1A) for storing information relating to the user's preferences relating to transfer of secured information, and/or as secured information transmission log (SIT_Log) (shown as optional SIT_Log 64*h* in FIG. 1A), for storing information indicative of the user's preferences relating to tracking events related to secured information transfers. Optionally, both SIT_Profile and SIT_Log may be presented in a unified format.

Advantageously, from the point of view of a user, the interface for necessary interaction with the various components of the SITM system 10, and especially with the IBSM system 60, may be implemented as a separate program application, or function, of a user's InfoTr system, or as a communication portal accessible by the users' InfoTr system (for example, a secure website). Optionally, the SITM system 10, and its components, may be implemented transparently in the background, for example, as components, modules or "plug-ins" for existing applications/functions of the user's InfoTr system, such that a user can continue to utilize their preferred information transfer applications/functionality, while gaining the full benefit of the SITM system 10. In any implementation of the novel SITM system, the registered users may gain access to IBSM system functionality through an appropriate identity verification or "login" procedure, that may optionally be integrated into the process of initiating secure information transmission or information access.

In addition, while a less secure implementation than described above, in an alternate embodiment of the SITM system 10, each InfoTr system can perform user identity verification locally, and, rather than transmitting newly acquired UBIV_Elements to the IBSM system 60 for centralized identity verification, each InfoTr system can simply indicate the status of the local verification to the IBSM system 60.

Referring now to FIG. 5, an exemplary embodiment of a process 400 for secured transmission of information utilizing the inventive SITM system (for example, the SITM system 10 of FIG. 1A) is shown. As noted above, as a matter of design choice, the various steps of this process may be executed by different components of the various embodiments of the inventive SITM system shown in FIGS. 1A to 3.

The process 400 begins at a step 402, where a sending user (hereinafter "Sender"), registered with the IBSM system component of the inventive SITM system, decides to transmit secured information to one or more other registered users of the SITM system (hereinafter "Recipient"). At a step 404, the Sender generates Recipient_INFO, to identify the Recipient selected at step 402, and that may optionally include one or more rules, for example, from a Sender SECURITY_ Policy or the sender's SIT_Profile, relating to requirements that must be met by the Recipient to gain access to the secured information, but at a minimum requiring biometric verification of the Recipient's identity.

At a step 406, the Recipient_INFO is transmitted to the IBSM system (or simply passed to the appropriate component thereof, if step 404 was being performed at the IBSM system), optionally, along with Sender_BIVE (Sender biometric identity verification element, representative of biometric information provided by the Sender), that enables the IBSM system to verify the identity of the Sender, both for internal security purposes, and optionally for provision of that verified information to the Recipient. At a step 408, the process 400 verifies the Sender_BIVE (and optionally updates the Sender SIT_Log, if any), at a step 410, generates a SIT (e.g., by encrypting information to be transmitted), and at a step 412, transmits the SIT to the Recipient.

At a step 414, upon receipt of the SIT, the process 400 requests the Recipient to verify their identity, in accordance with the requirements sent forth by the Sender in Recipient_INFO (e.g., by presenting their BIVS with biometric information to enable it to generate a corresponding Recipient_BIVE (Recipient biometric identity verification element), representative of biometric information provided by the Recipient). The Recipient_BIVE is then transmitted, at a step 416, to the IBSM system, and verified against the Recipient's UBIV_Element (in addition to any other verifications that may have been required by the Recipient_INFO) stored in the Recipient's USER_Record. Assuming the verification criteria in the Recipient_INFO has been met, at a step 418, the SIT is decrypted and the Recipient is given access to information therein. At an optional step 420, the process 400 optionally verifies to Sender that Recipient has received and accessed the SIT, and optionally updates the Sender's SIT_Log and/or the Recipient's SIT_Log, with the results of one or more of the previously performed steps.

Referring now to FIG. 1B, an alternate embodiment of the inventive SITM system is shown as a SITM system 70. The SITM system 70 operates substantially similarly to the SITM system 10 of FIG. 1A, with the various components thereof having like reference characters, except that the functionality of the BIVS 26 and 36, is implemented in a different manner. Rather than each InfoTr system 22, 32 having access to a full featured BIVS, they each include one or more respective biometric identity verification devices (BIVD(s)) 72, 74 only, each with sufficient application functionality to enable it to acquire appropriate biometric information, and provide it, preferably in encrypted form, to the IBSM system 60. Each BIVD(s) 72, 74 serves as the physical device responsible for acquiring one or more specific biometric characteristics of the user. Examples of a BIVD include, but are not limited to: a fingerprint scanner, palm scanner, vein scanner, facial recognition scanner, iris scanner, retinal scanner, signature acquisition device, voice acquisition device, etc.

The IBSM system 60, as implemented in the SITM system 70, is supplied with a centralized biometric identity verification application (BIVA) 76 that performs all necessary functions necessary to generate UBIV_Elements from information received from BIVD(s) 72, 74, and appropriate functionality to perform necessary biometric identity verification, and any other required security 15 measures. Other than as is noted above, the SITM system 70 operates in a manner similar to the SITM system 10 of FIG. 1A.

Referring now to FIGS. 2 and 3, exemplary embodiments of the novel SITM system, having more complex implementations that are shown in FIG. 1A, but operating on the same novel principles. Referring first to FIG. 2, a SITM 20 system 100 is shown, that includes all of the components of the SITM system 10 shown in FIG. 1A and described in connection therewith, but that also includes an additional BIVS 102 provided to the InfoTr system 32, and optionally yet another standalone separate BIVS 104 (each including a single BIVD), that may also be provided thereto, shown as an example to illustrate that the user 30 may register all three BIVS 36, 102, 104 with the IBSM system 60 and then utilize any of the registered BIVS for necessary identity verification therewith.

Similarly, as another example, a user 112, having an InfoTr system 114, may be provided with a separate BIVS/EDA standalone security device 116, capable of performing the functions of a BIVS 120 and of an EDA 118, which may be local to the user 112, or which the user 112 may utilize through a communication link 122 (for example, if the device 116 is a voice recognition based device, the user 112 may contact the device 116 though their InfoTr system 114 and provide the necessary voice sample). In one example of utilization of the SITM system 100, the user 20 may transfer the SIT 52 to the user 30 with one set of Recipient_INFO (see Process 400, FIG. 5), and also send the same SIT 52 to the user 112, with a different Recipient_INFO.

Referring now to FIG. 3, a SITM system 200 is shown, that includes all of the components of the SITM systems 10 (FIG. 1A) and 100 (FIG. 2), but that also includes an additional group of users, shown as a private network 202. The private network 202 may include an InfoTr server 204 (e.g. a robust computer, such as a server, or group of servers), equipped with an EDA 206, and additional users 208, 214 having corresponding InfoTr systems 210, 122, supplied with corresponding BIVSs 212, 218, and optional EDAs 220, 222. In the SITM system 200, certain functionality of the individual InfoTr systems of the users, and/or of the IBSM system 60 may be taken over by the InfoTr server 204. For example, the InfoTr server 204 may utilize a powerful EDA 206 to perform all decryption operations (upon successful recipient identity verification) on a SIT 232, sent by the user 112, arriving to the private network 202 via a communication link 230, and designated for one, or both, of the users 208, 214, and/or also perform the encryption operations on a SIT 228, sent, from the private network 202 via a communication link 226, to the user 20 by one of the users 208, 214.

Referring now to FIG. 4, an alternate embodiment of the inventive SITM system of FIG. 1A that enables registered users to control and verify access to stored content by other parties by specifying one or more other registered users, and optionally by specifying one or more criteria for accessing certain content (similarly to as described above in connection with access to information in the SITs). The users 20 and 30, as well as their respective InfoTr systems 22, 32, EDAs 24, 34, and BIVSs 26, 36, are as described above in connection with FIG. 1A. Similarly, the additional users 330 and 340 shown by way of example, have access to their respective InfoTr systems 332, 342, EDAs 334, 344, and BIVSs 336, 346, and may communicate with the IBSM system 60 via respective communication links 350, 352. All of the InfoTr systems 22, 32, 332, 324, are able to communicate with a content system 302 via respective communication links 354, 356, 358 and 360. As noted above, in connection with FIG. 1A, the various communication links shown in FIG. 4 may be similar to at least some of the other links, or may be all of the same configuration (e.g., the Internet).

The content system 302 preferably includes at least one item of content (see Table 1, definition #7), with three content items 304, 306, and 308, being shown by way of example. A particular user who owns, or is authorized to control access to, a particular content item or items, creates a secure content access profile (SCA_Profile) that may be stored with the content item, or at the IBSM system 60, and that provides criteria for accessing the content item, that may be as simple or as complex as the user chooses. For example, if the user 20 owns content 304, they may specify in a SCA_Profile 310 that only users 30 and 344 may access the content item 304 upon successful identity verification by the IBSM system 60, and that the access granted to the user 330 expires after 10 days of being granted.

In another example, if the user 30 controls access to the content item 306 which includes separate content items 312, 314 (while two are shown by way of example, a content item may include an unlimited number of other content items in a flat or a hierarchical architecture), with the user 30 defining separate SCA_Profiles 316, 318 therefor, or defining different access rules for each separate content item 312, 314 in one SCA_Profile.

In yet another example, the user 330, may define multiple SCA_Profiles 320 for content item 308, for example, based on time, specific authorized access users, and/or on other criteria. In addition, content item 308 (and of course any other content item), may include an optional content access record (CA_Record) 322, that includes information related to access to the content item, and optionally, related to failed access attempts.

Optionally, in one embodiment of the inventive SITM system 300, the IBSM system 60 and the content system 302 may be implemented as a single system 364. This may be advantageous in applications where a large amount of content items are to be managed, and/or where there is a large quantity of complex SCA_Profiles, and/or when content items are encrypted—ie. in situations that may require an IBSM system 60 dedicated to supporting the content system. Alternately, the content system 302 may be implemented in a particular user's own InfoTr system. Of course, it should also be noted, that the functionality described in connection with the SITM system 300 may be readily combined with SITM systems 10, 70, 100, and 200, described above in connection with FIGS. 1A, 1B, 2, and 3, respectively, because any embodiment of the novel SITM system can readily support both functionality related to verified secure information transmission, as well as to secured access control.

In an alternate embodiment of the invention, the same principles of SITM system 300 implementation, as are described above in their application to content access control, may be readily extended to include physical access control, whether location based (e.g., door), or item based (e.g., a safe, a computer).

Figure 6:
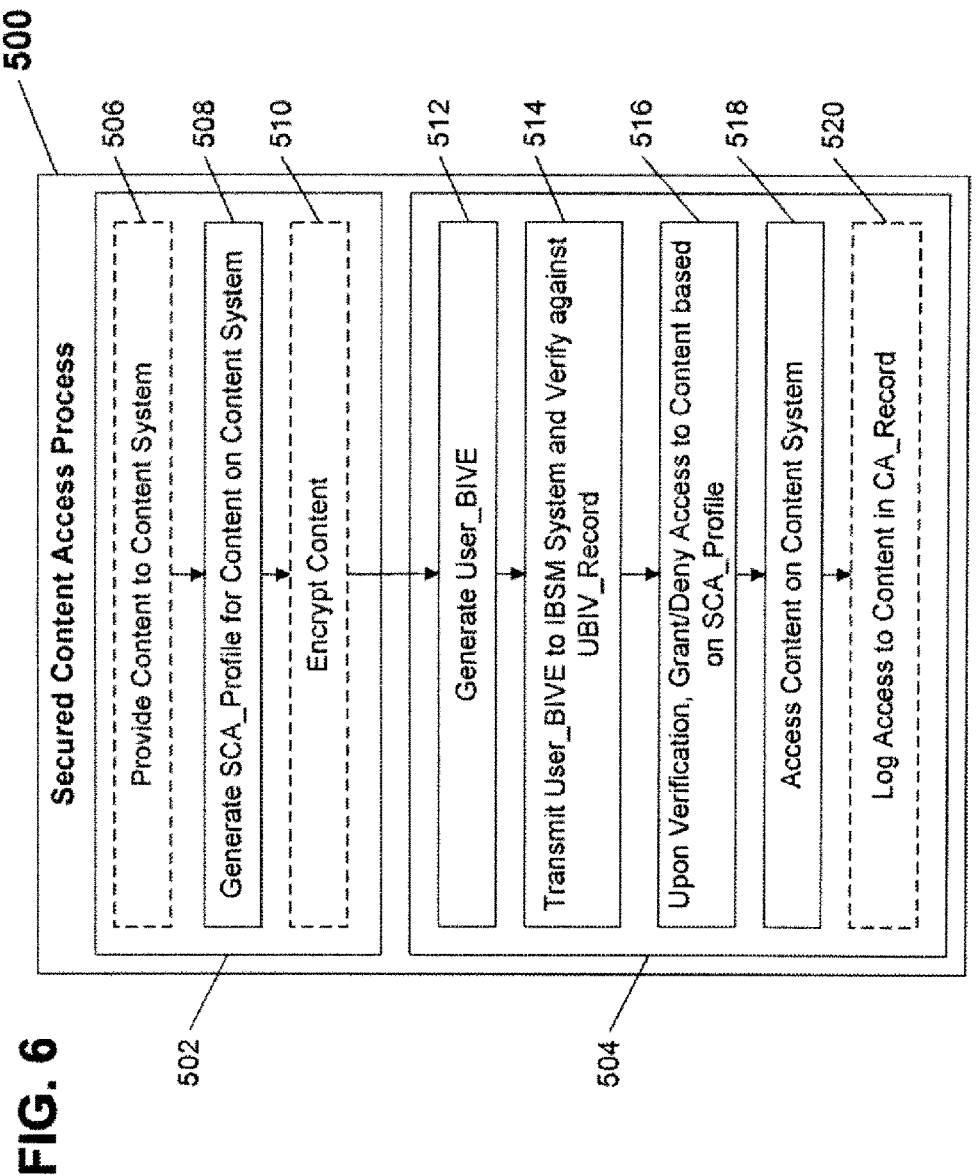
FIG. 6 shows a logic flow diagram of an exemplary embodiment of a process of implementing and utilizing the SITM system of FIG. 4.

Referring finally, to FIG. 6, an exemplary embodiment of a process 500 for demonstrating the process of secured content access utilizing the inventive SITM system (for example, the SITM system 300 of FIG. 4) is shown. As a matter of design choice, the various steps of this process may be executed by different components of the inventive SITM system 300 of FIG. 4.

The process 500 preferably includes two portions—(1) a configuration portion 502, which includes steps 506 to 510, and which is directed to configuring the SITM system 300 for the owner thereof, and (2) a access control portion 504, which includes steps 512 to 520, and which is directed to controlling access to the content stored on the content system.

The process 500 may begin at an optional step 506, where user may provide one or more content items to a content system to be secured. If the content item (or items) to be secured is already present on the content system, the process 500 beings at a step 508, where the user creates a SCA_Profile that provides criteria for accessing the content item by one or more other parties, registered with the IBSM system component of the inventive SITM system. At an optional step 510, the process 500 encrypts the user's content item (this step is optional because it is possible to control access to content without encrypting it)—this concludes the configuration portion 502 of the process 500.

Later, at a step 512, a different user attempts to access secured content, and at a step 514, transmits, biometric information acquired through their BIVS in form of a User_BIVE to the IBSM system (along with any other information that may be required by the SCA_Profile), whereupon, the IBSM system verifies the supplied User_BIVE (and other information, if any), against the UBIV_Elements stored in the UBIV_Record of the USER_Record of the user.

Upon successful verification, at a step 516, the user is granted access to the content item in accordance with the rules specified in the SCA_Profile for that content item (if any were defined), and may access the content at a step 518. At an optional step 520, the process 500 records events relating to various steps thereof in the CA_Record of the content item.

Figure 7:
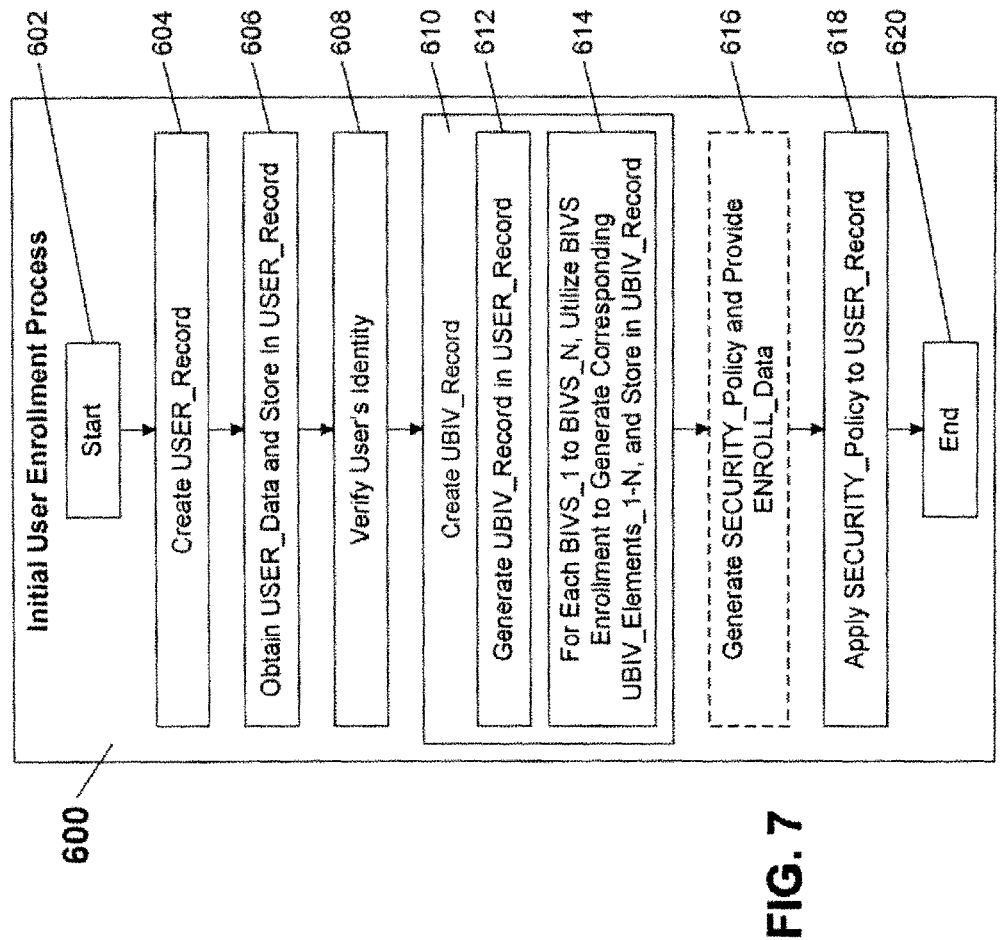
FIG. 7 shows a logic flow diagram of an exemplary embodiment of a process of initial enrollment of a user prior to utilization of the SITM system of FIGS. 1A-3.

Referring now to FIG. 7, an exemplary embodiment of an advantageous initial user enrollment/registration process is shown as the initial user enrollment process 600. The initial user enrollment process 600 may be advantageously utilized in conjunction with any embodiments of the inventive SITM systems 10, 70, 100, 200, and 400, described above in connection with FIGS. 1A, 1B, 2, 3, and 4, respectively.

The process 600 starts at a step 602 when a user, or an authorized person (such as an organization's security administrator), initiates enrollment. At a step 604, the process 600 creates a USER_Record for the user being registered (hereinafter the "registrant"). At a step 606, the process 600 obtains USER_Data from the registrant and stores it in the corresponding USER_Record created at the step 604. The USER_Data must be sufficient to identify the registrant and may optionally include certain personal information, password(s), and security questions and answers that may be utilized during future enrollments of additional BIVS(s) (as described in greater detail below in connection with FIG. 8.

Then, at a step 608, the process 600 verifies the identity of the registrant. This may be readily done by a security administrator overseeing the process 600 in an organizational setting, or through other well known identity verification means (e.g., by sending an email to the registrant's email address with a verification code, by calling and speaking with the registrant, or even by physically mailing a verification code to the registrant's address).

At a step 610, the process 600 creates a UBIV_Record for the registrant's biometric enrollments, first, at a step 612, by generating the UBIV_Record configured to store and utilize multiple concurrent UBIV_elements generated from enrollment through multiple BIVS(s) and storing it in the USER_Record, and second, at a step 614, generating UBIV_Elements_1 through _X, by utilizing the enrolment function of each BIVS to be used by the registrant (BIVS_1 to _N) to generate corresponding UBIV_Elements_1 to _X, and store them in the registrant's UBIV_Record. Optionally, if there is a pre-existing biometric security system (not shown) that comprises records with biometric enrollments for one or more users, and that can communicate with the inventive SITM system being used, as part of the registration process, the IBSM system can readily import existing biometric enrollments as UBIV_Element(s) for each user into the UBIV_Record stored in their individual USER_Record. In this case, the user having such previously obtained biometric enrollment(s) for specific BIVS(s), would not need to repeat the enrollment procedure for those systems/devices.

If a SECURITY_Policy does not already exist for the SITM system being used, at an optional step 61, the process 600 enables the registrant to generate a SECURITY_Policy (and to define corresponding security protocol(s)), and enables the registrant to provide ENROLL_Data that may be stored in the USER_Record and later used to verify the registrants identity remotely when enrolling additional BIVS(s), for example as described below in connection with FIG. 8. At a step 618, the process 600 applies the SECURITY_Policy of the owner or subscriber of the SITM system being utilized to the USER_Record (or applies the SECURITY_Policy generated by the user at the optional step 616), and ends at a step 620.

Figure 8:
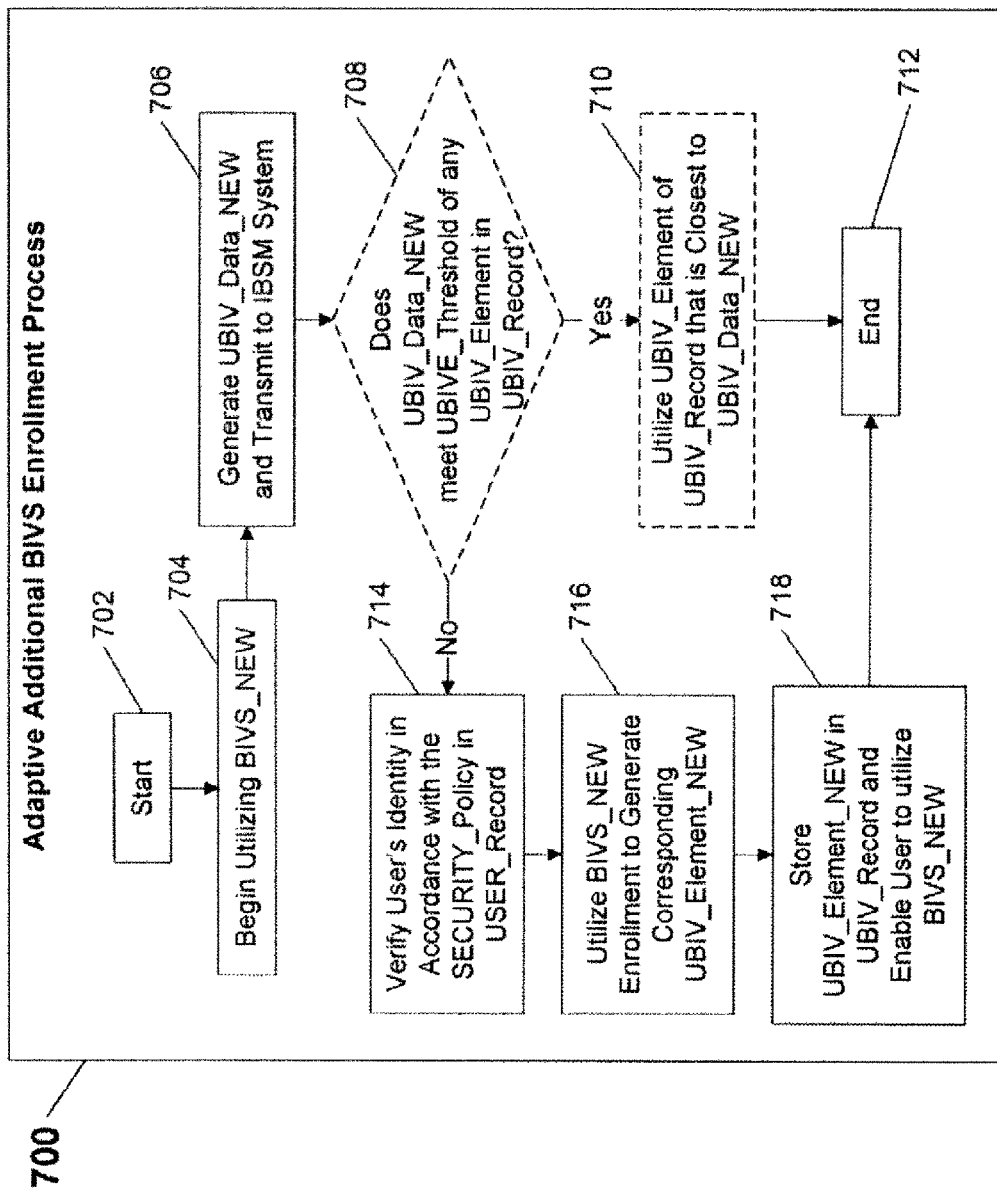
FIG. 8 shows a logic flow diagram of an exemplary embodiment of a process of enrollment of an additional biometric identity verification system by a user of the SITM system of FIGS. 1A-3.

Referring now to FIG. 8, a novel adaptive process for adding additional BIVS enrollments to the USER_Record of a user, is shown as an adaptive additional BIVS enrollment process 700. The process 700, advantageously relies on the capability of UBIV_Records to store and use a virtually unlimited number of UBIV_Elements for virtually any BIVS, in each USER_Record, by providing users with the ability to readily, and in certain cases transparently add support for additional new BIVS to their USER_Record.

The process 700 begins at a step 702 when the user initiates the addition of support, in their USER_Record, for a new BIVS, by starting to utilize a new BIVS (BIVS_NEW) at a step 704, for example by using it in conjunction with a function of the SITM system being used (such as to transmit a SIT to a recipient from an InfoTr system having a BIVS_NEW that is not enrolled in the user's USER_Record). At a step 706, the process 700 generates a BIVS output that is normally generated during ordinary use of the BIVS_NEW as UBIV_Data_NEW (such as a template or image for fingerprint recognition, or iris image capture for an iris scanner, etc.) and transmits it to the IBSM system.

In a preferred embodiment of the present invention, the process 700 is adaptive and includes optional steps 708 and 710. If the process 700 is not configured to be adaptive, after step 706, it proceeds to a step 714. At the step 708, the process 700 determines whether the UBIV_Data_NEW received by the IBSM system meets a predetermined UBIV-E_Threshold of any existing UBIV_Element in UBIV_Record. The UBIVE_Threshold (defined in Table 1) is representative of the minimum similarity between a submitted UBIV_Data_NEW and one or more currently stored UBIV_Elements that would enable acceptable identity verification of the user by comparing the submitted UBIV_Data_NEW that meets the UBIVE_Threshold with the closest matching existing UBIV_Element stored in the UBIV_Record. The ENROLL_Policy of the USER_Record's SECURITY_Policy preferably stores the UBIVE_Threshold. If the UBIV_Data_NEW meets or exceeds the UBIVE_Threshold, then, at the step 710, the process 700 utilizes the closest matching existing UBIV_Element stored in the UBIV_Record to verify the user's identity without forcing the user to formally enroll the BIVS_NEW in the USER_Record. This adaptive approach is advantageous because it enables users of the novel SITM system to readily utilize BIVS, which they never formally enrolled, transparently and "on-the-fly". For example, if the BIVS_NEW is a new model of a fingerprint scanner, the UBIV_Data_NEW sent to the IBSM system is the captured fingerprint image and/or template, and the UBIVE_Threshold is 75%, then the user would be able to utilize the BIVS_NEW for identity verification as long as the process 700 determines that there is at least a 75% match between the UBIV_Data_NEW and at least one of the UBIV_Elements stored in the UBIV_Record. The process 700 then ends at a step 712.

If the UBIV_Data_NEW is not sufficient to meet the UBIVE_Threshold (or if the process 700 is not adaptive), the process 700 proceeds to the step 714, at which it verifies the user's identity in accordance with the SECURITY_Policy in the USER_Record. This may be readily done by a security administrator overseeing the process 700 in an organizational setting, by using another BIVS connected to the same system as the BIVS_NEW, or through other well known identity verification means (e.g., by sending an email to the registrant's email address with a verification code, by calling and speaking with the registrant, or even by physically mailing a verification code to the registrant's address). Optionally, if the user provided ENROLL_Data during process 600 of FIG. 7, the ENROLL_Data can be used to simplify the identity verification during the process 700, for example by the user answering one or more predetermined security questions.

At a step 716, the process 700 utilizes the standard BIVS_NEW enrollment procedure to generate a corresponding UBIV_Element_NEW, and, at a step 718, stores the UBIV_Element_NEW in the UBIV_Record, thus enabling the user to readily utilize the BIVS_NEW alone or in conjunction with other previously enrolled BIVS(s).

Finally, it should also be noted, that while the various above-described embodiments of the novel SITM system provide for securing (e.g., encrypting) the transferred information between the parties, the inventive system and method may also be readily utilized for sender and/or recipient identity verification only, without the transferred information being secured in any way. This alternate embodiment of the inventive system and method may be advantageous for applications where security and control of access to transferred data is not important, but where verification of identity of the sender and/or of the recipient accessing the information, is necessary and/or desired.

Thus, while there have been shown, described and pointed out fundamental novel features of the invention as applied to preferred embodiments thereof, it will be understood that various omissions, substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method of independent biometric identification of a user comprising the steps of:
    receiving, by an application server, an access request from a user's system;
    when the access request is received, forwarding the user's system to an independent remote biometric identification server, wherein the independent remote biometric identification server
    i) obtains the user's biometric characteristics using a biometric service provider which interfaces with a capture device connected to the user's system, the capture device being enabled by a software component provided by the independent remote biometric identification server to the user's system,
    ii) creates a token after successfully identifying the user by comparing, in the independent remote biometric identification server, said obtained biometric characteristics to templates stored in a database, the token indicating that the comparison successfully identified the user, and
    iii) subsequently provides the token to the user's system;
    directly receiving, by the application server from the user's system, the token which was created by the independent remote biometric identification server after the user's system is forwarded to the independent remote biometric identification server when the access request is received by the application server;
    requesting, by the application server from the independent remote biometric identification server, information associated with the token upon receiving the token from the user's system;
    receiving, by the application server from the independent remote biometric identification server, the information associated with the token; and
    deciding, by the application server, whether to grant the request from the user's system for access based on the information associated with the token,
    wherein the steps are performed sequentially.

2. The method of independent biometric identification of a user according to claim 1, further comprising the steps of managing the independent biometric identification server using a biometric administration agent.

3. The method of independent biometric identification of a user according to claim 1, wherein said biometric characteristics comprise one or more of a human fingerprint, human iris feature, human retina feature, hand feature, human facial feature, human voice, or human writing style.

4. A method of independent biometric identification of a user comprising the steps of:
    receiving an access request from an application server, which is independent from a user's system, by an independent remote biometric identification server;
    the independent remote biometric identification server connecting to the user's system upon receiving the access request from the application server and providing the user's system with a software component that captures the user's biometric characteristics with a capture device connected to the user's system;
    receiving the captured user's biometric characteristics from the user's system by the independent remote biometric identification server;
    comparing, by the independent remote biometric identification server, the received user's biometric characteristics with templates stored in a database in order to identify the user;
    if the user is successfully identified, the independent remote biometric identification server providing a token indicating that the comparison successfully identified the user to the user's system, wherein the user's system subsequently directly provides the token, which is created after connecting the user's system to the independent remote biometric identification server when the independent remote biometric identification server received the access request from the application server, to the application server in order for the application server to send the token to, and request information associated with the token from, the independent remote biometric identification server; and
    upon receipt of the token from the application server, the independent remote biometric identification server providing the application server with information associated with the token, the application server deciding whether to grant access to resources to the user based on the information associated with the token received from the independent remote biometric identification server.

5. The method of claim 4, wherein the token expires after the information associated with the token is provided to the application server.

6. The method of independent biometric identification of a user according to claim 4, wherein said biometric characteristics comprise one or more of a human fingerprint, human iris feature, human retina feature, hand feature, human facial feature, human voice, or human writing style.

\* \* \* \* \*